United States Patent [19]

Yokomori

[11] Patent Number: 5,095,389
[45] Date of Patent: Mar. 10, 1992

[54] BEAM SHAPING OPTICAL SYSTEM
[75] Inventor: Kiyoshi Yokomori, Yokohama, Japan
[73] Assignee: Ricoh Company, Ltd., Tokyo, Japan
[21] Appl. No.: 621,860
[22] Filed: Dec. 4, 1990
[30] Foreign Application Priority Data Dec. 21, 1989 [JP] Japan ................................ 1-331622
Jun. 6, 1990 [JP] Japan ................................ 2-148368

[51] Int. Cl.$^5$ ........................ G02B 5/04; G02B 27/10; G02B 6/10
[52] U.S. Cl. .................................... 359/833; 359/638; 385/36; 369/44.23
[58] Field of Search ................... 350/96.12, 96.19, 286, 350/173; 369/44.23

[56] References Cited
U.S. PATENT DOCUMENTS 3,584,230 6/1971 Tien .................................. 350/96.12
4,877,301 10/1989 Yokomori et al. ............... 350/96.12

Primary Examiner—Jon W. Henry
Attorney, Agent, or Firm—Cooper & Dunham

[57] ABSTRACT

A beam shaping optical system has an optical prism; a gap layer stacked on a reflecting face of the optical prism and having a refractive index lower than that of the optical prism; and a waveguide layer stacked on the gap layer and having a refractive index lower than that of the optical prism and higher than the refractive index of the gap layer, the optical prism, the gap layer and the waveguide layer constituting a prism coupler. The prism coupler is adapted to reflect a collimated light beam made incident to the prism coupler on a stacking face of the optical prism such that the diameter of the incident light beam in a direction parallel to an incident face of the prism coupler is changed to shape the incident light beam, the gap layer and the waveguide layer being stacked on the stacking face. The waveguide layer may be stacked on a transparent substrate and the refractive index of the waveguide layer may be higher than that of the transparent substrate. The optical prism and the gap layer may be adhered to each other by an adhesive layer having a refractive index higher than that of the waveguide layer. Optical axes of the light beams incident and emitted from the prism coupler may form a straight line. Thicknesses of the gap layer may be different from each other in accordance with positions thereof.

4 Claims, 2 Drawing Sheets

BEAM SHAPING OPTICAL SYSTEM

BACKGROUND OF THE INVENTION

1. Field of the Invention

The present invention relates to an optical system for changing the shape of a light beam. More particularly, the present invention relates to an optical system for shaping a light beam in a semiconductor laser, etc. used in a pickup for an optical disk.

2. Description of the Related Art

In general, semiconductor lasers have aspect ratios different from each other in their light emitting regions. Accordingly, it is indispensable to dispose a beam shaping optical system when a circular light spot is formed on the optical disk.

However, the general beam shaping optical system using a prism has the following disadvantages.

(1) It is difficult to adjust an optical path in the optical system since an optical path is bent by the prism.

(2) When a light beam provided by a joining lens is slightly shifted from a collimated light beam, astigmatism is caused by the prism. Therefore, asymmetric aberration is caused with respect to a light spot converged by a condenser lens.

(3) When ratios of divergent angles of light beams emitted in directions perpendicular to each other are greatly different from each other every semiconductor laser, it is necessary to replace the prism by another prism and change an incident angle of the laser beam incident to the prism. Therefore, it is necessary to adjust the operation of the entire optical system again.

SUMMARY OF THE INVENTION

It is therefore an object of the present invention to provide a beam shaping optical system for easily adjusting a light beam in an optical system.

The above object of the present invention can be achieved by a beam shaping optical system comprising an optical prism; a gap layer stacked on a reflecting face of the optical prism and having a refractive index lower than that of the optical prism; and a waveguide layer stacked on the gap layer and having a refractive index lower than that of the optical prism and higher than the refractive index of the gap layer, the optical prism, the gap layer and the waveguide layer constituting a prism coupler, the prism coupler being adapted to reflect a collimated light beam made incident to the prism coupler on a stacking face of the optical prism such that the diameter of the incident light beam in a direction parallel to an incident face of the prism coupler is changed to shape the incident light beam, the gap layer and the waveguide layer being stacked on the stacking face.

In the above structure, a portion of light incident to the prism coupler reaches the waveguide layer and constitutes waveguide light and is propagated through the waveguide layer. Thereafter, this light portion is emitted from the prism coupler. The other light portions do not constitute the waveguide light and are reflected by the prism coupler and the gap layer and are then emitted from the prism coupler.

Therefore, it is possible to provide a beam shaping optical system for easily adjusting a light beam in an optical system.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a beam shaping optical system in the present invention will next be described in detail with reference to the accompanying drawings.

Figure 1:
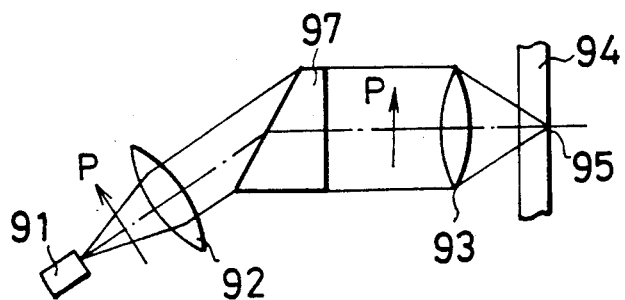
FIG. 1 is a view for explaining a general beam shaping optical system.

FIG. 1 shows an example of a general optical system for shaping a light beam.

In FIG. 1, the optical system changes an elliptic beam emitted from a semiconductor laser 91 to a circular beam spot on an optical disk. The elliptic beam from the semiconductor laser 91 is changed to a parallel light beam by a joining lens 92. At this time, a beam diameter in the direction of an arrow P in FIG. 1 is smaller than that in a direction perpendicular to a paper face. The elliptic beam constituting the parallel light beam is transmitted through a prism 97 so that the beam diameter in the direction of another arrow P is increased and is approximately equal to that in the direction perpendicular to the paper face. Thus, the approximately circular parallel beam is converged by a condenser lens 93 and is formed as a small circular light spot 95 on the optical disk 94. The change in shape from the anisotropic beam to the circular beam caused by the prism 97 is called beam shaping. In general, semiconductor lasers have aspect ratios different from each other in their light emitting regions. Accordingly, it is indispensable to dispose the above-mentioned beam shaping optical system when a circular light spot is formed on the optical disk.

However, the general beam shaping optical system using the prism 97 in FIG. 1 has the following disadvantages.

(1) It is difficult to adjust an optical path in the optical system since the optical path is bent by the prism 97.

(2) When the light beam provided by the joining lens 92 is slightly shifted from a collimated light beam, astigmatism is caused by the prism 97. Therefore, asymmetric aberration is caused with respect to the light spot 95 converged by the condenser lens 93.

(3) When ratios of divergent angles $\theta$ of light beams emitted in directions perpendicular to each other are greatly different from each other every semiconductor laser 91, it is necessary to replace the prism 97 by another prism and change an incident angle of the laser beam incident to the prism 97. Therefore, it is necessary to adjust the operation of the entire optical system again.

Figure 2:
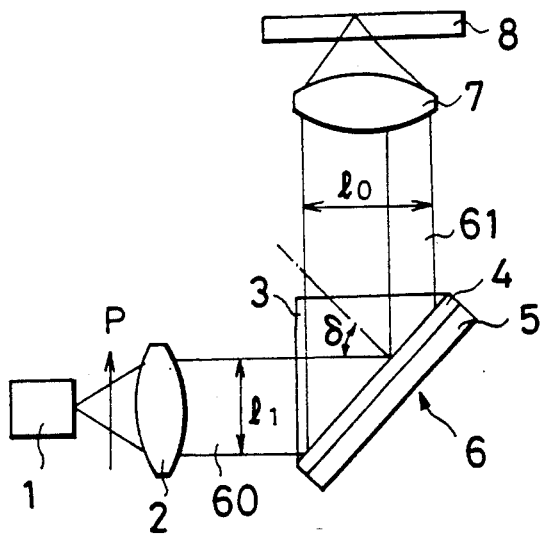
FIG. 2 is a view showing the construction of a beam shaping optical system in a first embodiment of the present invention.

FIG. 2 is a view showing the construction of a beam shaping optical system used to shape a light beam in a semiconductor laser in accordance with a first embodiment of the present invention.

In FIG. 2, a semiconductor laser 1 is used as a light source. A collimator lens 2 changes a light beam emitted from the semiconductor laser 1 to a parallel light beam. A prism coupler 6 constitutes one feature of the present invention. A condenser lens 7 converges a light beam emitted from the prism coupler 6. An optical disk 8 is used as an optical recording medium.

A divergent light beam emitted from the semiconductor laser 1 is changed to a collimated light beam by the collimator lens 2. At this time, the divergent light beam from the semiconductor laser 1 is elliptic. In FIG. 2, a divergent angle $\theta_1$ of the light beam in the direction of arrow P is less than a divergent angle $\theta_2$ of the light beam perpendicular to a paper face.

The parallel laser beam is incident to a prism coupler 6. The prism coupler 6 is constructed by a prism 3 having a refractive index $n_p$, a waveguide layer 5 having a refractive index $n_w$ lower than the refractive index $n_p$ of the prism 3, and a gap layer 4 having a refractive index $n_\theta$ lower than the refractive index $n_w$ of the waveguide layer 5. The prism coupler 6 is formed by sequentially stacking the gap layer 4 and the waveguide layer 5 with each other on a reflecting face of the prism 3.

A portion of light transmitted onto a boundary face between the prism 3 and the gap layer 4 constitutes an evanescent wave and reaches the waveguide layer 5. Thus, this light portion constitutes waveguide light and is propagated through the waveguide layer 5. Such propagation is called coupling. The other light portions do not constitute waveguide light and are reflected by the prism 3 and the gap layer 4 and are emitted from the prism 3. While the light portion constituting the waveguide light is propagated through the waveguide layer 5, this light portion is partially emitted again from the waveguide layer 5 through the gap layer 4 to the prism 3 and is then emitted from the prism 3. Such propagation is called decoupling. Thus, the waveguide light is almost emitted from the prism 3 at a diameter $l_0$ larger than a diameter $l_1$ of the incident light beam. Namely, the light beam having diameter $l_1$ incident to the prism coupler 6 is emitted as a light beam having diameter $l_0$ from the prism 3 through the waveguide layer 5 through the coupling and decoupling operations. The collimated light beam emitted from the prism 3 is converged by the condenser lens 7 as an approximately circular beam and is formed as a light spot on the optical disk 8, thereby completing a shaping operation of the light beam.

A minimum construction of the beam shaping optical system in the present invention is prescribed by the collimated light beam 60 incident to the prism coupler 6, the prism coupler 6 constructed as above, and the parallel light beam 61 emitted from the prism coupler 6.

The coupling and decoupling operations are performed by the prism 6 when the light beam is incident to the prism coupler 6 at an incident angle $\delta$ such that the refractive index $n_p$ of the prism 3 and an equivalent refractive index N of the waveguide layer 5 satisfy the following relation as a phase matching condition.

$$N = n_p \sin \delta.$$

The equivalent refractive index N is determined by the refractive index and thickness of the waveguide layer 5, the refractive index of the gap layer 4 and a wavelength of the incident light. The diameter $l_0$ of the light beam is increased as the thickness of the gap layer 4 is increased. Further, the diameter $l_0$ of the light beam is decreased as the thickness of the gap layer 4 is decreased.

Figure 3:
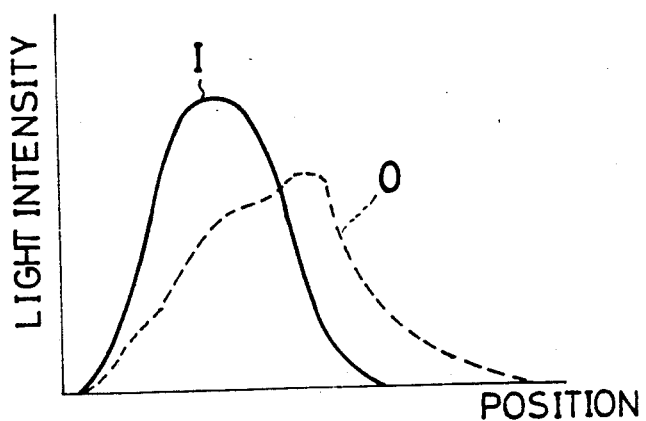
FIG. 3 is a graph showing intensity distributions of incident light I and emitted light O with respect to a prism coupler.

A concrete construction of the prism coupler 6 will next be described. The prism 3 has a high refractive index and is made of rutile having a refractive index $n_p = 2.58$. A spattering film made of $SiO_2$ and having a refractive index $n_\theta = 1.46$ is formed as the gap layer 4 on the prism 3 by a spattering method. Further, a film made of SiON and having a refractive index $n_w = 1.85$ and a thickness $d = 1.1$ μm is formed as the waveguide layer 5 by a plasma CVD system. At this time, the equivalent refractive index N of the waveguide layer 5 is equal to 1.824 and the incident angle $\delta$ of the light beam incident to the prism is equal to 45°. When the diameter $l_1$ (full diameter at half maximum) of a light beam incident to the prism coupler 6 is set to 4 mm, the diameter $l_0$ of a light beam emitted from the prism coupler 6 is equal to 6 mm. At this time, the wavelength of the laser beam is set to 790 nm. FIG. 3 shows light intensity distributions of the incident beam I shown by a solid line and the light beam O emitted from the prism coupler 6 and shown by a broken line. As shown in FIG. 3, a symmetry of the light intensity distribution with respect to the emitted beam O is broken, but there is no influence of this breakdown on a converged light spot formed by the condenser lens 7.

Figure 4:
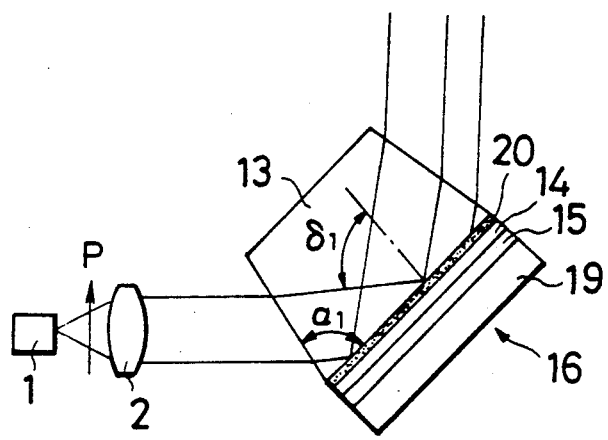
FIGS. 4, 5 and 6 are views respectively showing beam shaping optical systems in second, third and fourth embodiments of the present invention.

FIG. 4 shows a beam shaping optical system in a second embodiment of the present invention. In this second embodiment, a divergent light beam emitted from a semiconductor laser 1 is changed to a parallel light beam by a collimator lens 2 and is incident to a prism coupler 16. The prism coupler 16 is constructed by a transparent substrate 19 having a refractive index $n_b$, a waveguide layer 15 and a gap layer 14. The waveguide layer 15 has a refractive index $n_w$ higher than the refractive index $n_b$ of the transparent substrate 19 and is stacked on the transparent substrate 19. The gap layer 14 has a refractive index $n_\theta$ lower than the refractive index $n_w$ of the waveguide layer 15 and is stacked on the waveguide layer 15. The prism 13 has a refractive index $n_p$ higher than the refractive index $n_w$ of the waveguide layer 15. The prism 13 and the gap layer 14 are adhered to each other by an adhesive layer 20 having a refractive index $n_c$ higher than the refractive index $n_w$ of the waveguide layer 15. In this embodiment, the transparent substrate 19 is made of pyrex glass having refractive index $n_b = 1.52$. The waveguide layer 15 is formed by a spattering film made of SiON and having refractive index $n_w = 1.56$. The gap layer 14 is formed by a spattering film made of $SiO_2$ and having refractive index $n_\theta = 1.46$. The adhesive layer 20 is formed by a polyimide layer having refractive index $n_c = 1.70$. The prism 13 is made of optical glass SF11 having refractive index $n_p = 1.766$. An incident angle $\delta_1$ of a light beam incident to the prism coupler 16 is equal to 60° when an equivalent refractive index N of the waveguide layer 15 is equal to 1.529. When an angle $\alpha$ formed between the adhesive layer 20 and a face of the prism 13 for receiving the light beam from the collimator lens 2 is set to 78°, an angle between the light beam incident to the prism coupler 16 and a light beam emitted therefrom is equal to 90°.

Figure 5:
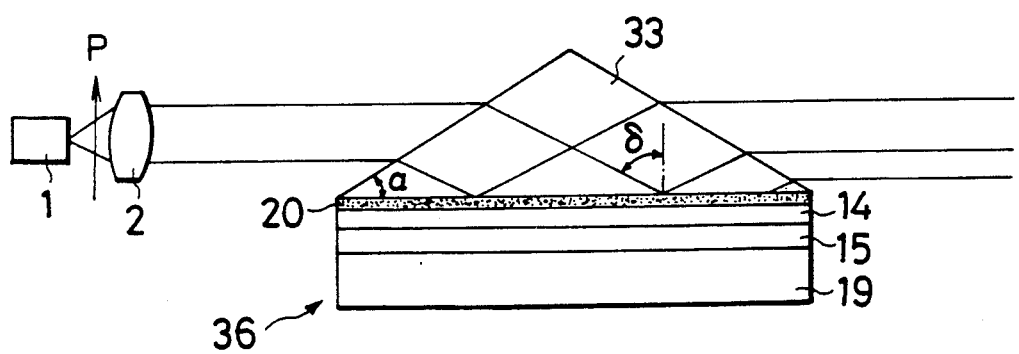

FIG. 5 shows a beam shaping optical system in a third embodiment of the present invention. The stacking structure of a prism coupler 36 in this third embodiment is similar to that of the prism coupler 16 in FIG. 4 except that the prism 13 in FIG. 4 is replaced by a prism 33 such that the optical axes of incident and emitted light beams form a straight line. An angle α formed between an adhesive layer 20 and a face of the prism 33 for receiving a light beam from a collimator lens 2 is set to 31°.

Figure 6:
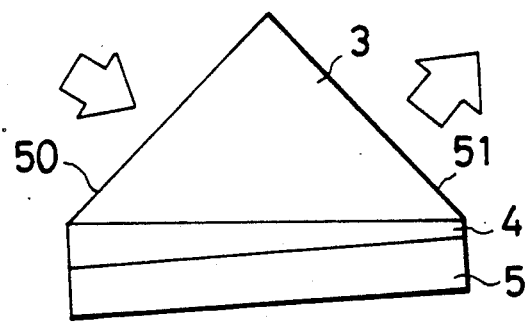

FIG. 6 shows a beam shaping optical system in a fourth embodiment of the present invention. The stacking structure of a prism coupler in the fourth embodiment is similar to that of the prism coupler 6 in FIG. 2 except that thicknesses of a gap layer 4 are different from each other in accordance with positions thereof. In the fourth embodiment, the thickness of the gap layer 4 is thicker on a beam incident side 50 thereof and is thinner on a beam emitting side 51 thereof. In such a structure, it is possible to adjust the height of a peak of the light intensity distribution O with respect to a light beam emitted from the prism coupler in FIG. 3. As a result, it is possible to adjust the light intensity distribution with respect to the emitted light beam.

When the light intensity distribution with respect to the emitted light beam in FIG. 3 is controlled, it is sufficient to optimize the thickness of the gap layer 4 when an equivalent refractive index N of a waveguide layer 5 is set to be constant. Similar effects can be obtained by suitably selecting the refractive indices and sequential arrangements of the gap layer 4 and the waveguide layer 5.

The beam shaping optical system in the present invention is not limited to a beam shaping optical system for a semiconductor laser, but can be clearly used for beam shaping in various kinds of optical systems.

In accordance with the present invention, the following effects can be obtained since the principle of a prism coupler is used.

(1) An optical path provided by the prism coupler is formed in the shape of a straight line or is formed to be perpendicular to this straight line so that it is easy to adjust the operation of an optical system.

(2) No asymmetric aberration is caused with respect to a converged light spot even when a light beam incident to the prism coupler is slightly shifted from a parallel light beam.

(3) It is sufficient to change only the thickness of a gap layer in the prism coupler when the diameter of an emitted light beam is changed with respect to that of the incident light beam. Accordingly, no change in optical path is required and it is sufficient to simply replace the prism coupler by another prism coupler.

Many widely different embodiments of the present invention may be constructed without departing from the spirit and scope of the present invention. It should be understood that the present invention is not limited to the specific embodiments described in the specification, except as defined in the appended claims.

What is claimed is:

1. A beam shaping optical system comprising:
   a collimating means for collimating a laser beam; and
   a prism coupler disposed in an optical path of said collimated laser beam and including an optical prism, a gap layer stacked on a reflecting face of said optical prism and having a refractive index lower than that of said optical prism, and a waveguide layer stacked on said gap layer and having a refractive index lower than that of said optical prism and higher than said refractive index of said gap layer,
   said prism coupler being arranged so that a plane including a shorter diameter of said collimated laser beam crosses perpendicularly said reflecting face of said optical prism, and that an incident angle δ of said laser beam made incident into said optical prism with respect to said reflecting face satisfies the following relation:

$$\delta = \sin^{-1}(N/n_p)$$

where N represents an equivalent refractive index of said waveguide layer, and $n_p$ represents said refractive index of said optical prism,
   said prism coupler being adapted so that each of said reflecting face, said gap layer and said waveguide layer extends beyond a part of said laser beam projected on said reflecting face toward an emitting side of said laser beam;
   said gap layer being formed so as not to increase in thickness from an incident side of said laser beam toward an emitting side of said laser beam.

2. A beam shaping optical system according to claim 1, in which a transparent substrate is stacked on said waveguide layer, said transparent substrate having a refractive index lower than that of said waveguide layer, and said optical prism and said gap layer are adhered to each other by an adhesive layer having a refractive index higher than that of said waveguide layer.

3. A beam shaping optical system according to claim 1, in which said prism coupler is arranged with respect to the collimated laser beam such that an optical axis of said collimated laser beam and an optical axis of a laser beam emitted from said prism coupler form a straight line.

4. A beam shaping optical system according to claim 1, which is adapted so that the thickness of said gap layer gradually decreases from an incident side of said laser beam toward an emitting side of said laser beam.

* * * * *